United States Patent
Bruch (10) Patent No.: US 12,352,728 B2
(45) Date of Patent: Jul. 8, 2025

(54) DETERMINATION OF GEOMETRIC DIMENSIONS

(71) Applicant: Baker Hughes Oilfield Operations LLC, Houston, TX (US)

(72) Inventor: Tobias Bruch, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 17 days.

(21) Appl. No.: 17/754,749

(22) PCT Filed: Oct. 6, 2020

(86) PCT No.: PCT/US2020/054409
§ 371 (c)(1),
(2) Date: Apr. 11, 2022

(87) PCT Pub. No.: WO2021/076358
PCT Pub. Date: Apr. 22, 2021

(65) Prior Publication Data
US 2024/0094169 A1    Mar. 21, 2024

Related U.S. Application Data

(60) Provisional application No. 62/915,199, filed on Oct. 15, 2019.

(51) Int. Cl.
*G01N 29/44* (2006.01)
*G01N 29/07* (2006.01)
*G01N 29/11* (2006.01)

(52) U.S. Cl.
CPC ......... *G01N 29/4427* (2013.01); *G01N 29/07* (2013.01); *G01N 29/11* (2013.01)

(58) Field of Classification Search
None
See application file for complete search history.

(56) References Cited

U.S. PATENT DOCUMENTS

2006/0267978 A1* 11/2006 Litke ................ G06T 17/20
345/419
2009/0301202 A1* 12/2009 Bisiaux ............ G01N 29/0609
73/622

(Continued)

FOREIGN PATENT DOCUMENTS

| JP | 2009-075034 A | 4/2009 |
| JP | 2012-008142 A | 1/2012 |
| KR | 10-1492336 B1 | 2/2015 |

*Primary Examiner* — Matthew G Marini
(74) *Attorney, Agent, or Firm* — Mintz, Levin, Cohn, Ferris, Glovsky and Popeo, P.C.

(57) ABSTRACT

Systems, methods, and a computer readable medium are provided for determining a minimum geometric dimension of an indication of an object being inspected using ultrasonic data. The system can include a computing device configured to receive ultrasonic data from an ultrasonic inspection device and to determine a contour of at least one indication of a defect. The computing device can apply a geometric template figure to the determined contour such that the geometric template figure is enclosed by the contour. At least one minimum geometric dimension of the indication can be determined based on determining a maximum dimension of the geometric template figure enclosed by the contour. The computing device can provide the at least one minimum geometric dimension of the indication.

20 Claims, 5 Drawing Sheets

(56) References Cited

U.S. PATENT DOCUMENTS

2014/0236499 A1\* 8/2014 St-Laurent ............. G01N 29/11
  702/36
2018/0113100 A1\* 4/2018 St-Laurent ............. G01N 29/11

\* cited by examiner

DETERMINATION OF GEOMETRIC DIMENSIONS

RELATED APPLICATION

The present application claims priority under 35 U.S.C. § 119 to U.S. Provisional Application No. 62/915,199 entitled "DETERMINATION OF GEOMETRIC DIMENSIONS," filed Oct. 15, 2019, which is hereby incorporated by reference in its entirety.

BACKGROUND

Ultrasonic inspection of industrial assets can be used to determine the presence and geometric dimensions of defects on or within the objects. Inspection operations are an important part of maintaining the industrial assets to ensure the assets are operating safely and free of performance-limiting defects. Defects can be classified as acceptable or unacceptable based on the dimensionality and shape of a particular defect. Rapidly and accurately performing inspection operations to assess the size and shape of defects with respect to inspection criterion can reduce operating costs, improve safety of the industrial assets and execution time of inspection operations.

SUMMARY

In one aspect, a system is provided. In one embodiment, the system can include an ultrasonic inspect device including one or more ultrasonic transducers configured to generate ultrasonic data associated with an object being inspected. The system can also include a computing device coupled to the ultrasonic inspection device. The computing device can include a data processor, and a memory storing computer-readable instructions. When executed the computer-readable instructions can cause the processor to perform operations including receiving the generated ultrasonic data. The ultrasonic data can include at least one indication of a defect of the object. The processor can also perform operations including determining a contour of the at least one indication. The processor can further perform operations including applying a geometric template figure to the determined contour of the at least one indication. The processor can also perform operations including determining at least one minimum geometric dimension of the at least one indication. The at least one minimum geometric dimension can be determined based on determining a maximum dimension of the applied geometric template figure enclosed by the determined contour. The processor can further perform operations including providing the at least one minimum geometric dimension.

Methods and non-transitory computer program products (i.e., physically embodied computer program products) that store instructions, which when executed by one or more data processors of one or more computing systems, causes at least one data processor to perform operations according to the methods herein are also described. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

DESCRIPTION OF DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure.

DETAILED DESCRIPTION

Ultrasonic inspection data can be used to determine geometric features, such as length, width, diameter, area, or volume, of indications of defects which may be present within or on an object being inspected. An important task in inspection operations is to determine whether or not dimensions of a defect, as represented by the indications of the defect in the ultrasonic inspection data, are within acceptable quality ranges associated with the object or use of the object in an industrial environment, such as an oil and gas production environment.

To determine whether or not the dimensions of an indication of a defect are within an acceptable range it is common to determine a specific threshold value against which geometric features of an indication of a defect can be compared. For amplitude-based C-Scan data, a one method includes utilizing a "6 dB-drop" method which determines the minimal length and width of an indication of a defect based on the coordinates for which the amplitude has dropped by 6 dB from its maximum value. For indications which perfectly match a specific geometric figure such as a circle, ellipse or rectangle the "6 dB-drop" method results in the actual geometric dimensions of the indication of the defect. However, for non-perfectly shaped indications this method is not able to determine the actual geometric dimensions since the utilizes ultrasonic data associated with specific coordinates such that the determined dimensions of width or length of the indication are only accurate for a certain region of the indication and as a result may overestimate the length or width for remainder of the indication. To compare the actual or minimal geometric dimensions of an indication from ultrasonic data and compare it to pass or fail inspection criterion, the indications need to be manually adjusted to match a specific geometric figure shape such as a circle, ellipse, square, rectangle or triangle. Such manual adjustment requires additional operator involvement, which can introduce errors and limits the method from being performed automatically.

Improved systems and methods are described herein for determining geometric dimensions of a defect in an object being inspected using ultrasonic data. The systems and methods can determine a contour of the indication based on the ultrasonic data received from an inspection device and can utilize an optimization algorithm to determine the maximum dimension of a geometric template figure which is enclosed by the contour. The geometric template figure for multiple separate contours can be automatically selected by an algorithm. For each of these single contours, the algorithm would automatically select the geometrical template figure by comparing the single contoured areas to templates, considering key coordinates with the ultrasonic data, or by maximizing the area of the geometric template figure.

In this way, the maximum dimension of the geometric template figure corresponds to the minimum geometric dimension of the indication of the defect enclosed by the determined threshold contour.

For example, during inspection of a spot weld, a minimum dimension of an indication of the formed spot weld nugget is required. Using amplitude-based C-Scan ultrasonic data or time of flight-based D-Scan ultrasonic data of the fused area of the spot weld, the systems and methods described herein determine the minimal geometric dimensions of the welded area by maximizing the dimension of a circle or an ellipse which is enclosed by a pre-defined threshold contour. The method automatically returns a numerical value of the geometric feature dimension of the welded area which can be used to automatically classify the inspection results against code criteria resulting in a pass or fail criteria.

The systems and methods described herein can also be applied to other weld applications such as laser-seam welding where the welded area is expected to have a square or rectangular shape. The systems and methods describe herein can determine the minimal geometric dimensions of the indication of the weld which can be compared to inspection criterion. Exemplary applications include, but are not limited to, weld inspection with angle beam probes, such as single element probes or phased array probes, straight-beam inspection using single element probes or phased array probes during inspection of composite materials or adhesive distribution, corrosion inspection using straight-beam phased array probes or transmit/receive phased array probes, or in immersion applications using single element probes or phased array probes.

The use of automatized systems and methods for determining the minimal geometric dimensions of an indication from ultrasonic data significantly speeds up the inspection process since the determined indication dimensions can be directly and automatically be cross-checked against pass or fail inspection criteria, allowing for an automated evaluation and identification of defects in the ultrasonic data. For example, in spot weld inspections or laser weld inspections, the evaluation of the fused area and geometric dimensions of the welded are a major pass or fail criterion. The described systems and methods can automatically determine these geometrical dimensions and check them against predefined inspection criterion allowing for automatized defect recognition for in these applications. In general, the evaluation of a defect indication's dimensions is critical in any ultrasound inspection operation. The proposed systems and methods facilitates the determination of a minimal indication dimension based on predefined geometric template figures which allow for better evaluation and comparability of indication dimensions in ultrasound inspection while removing operator bias from the evaluation of the inspection result. As a result, the time required to perform inspections can be reduced which can provide a significant cost savings.

Embodiments of systems and corresponding methods for determining geometric dimensions of a defect of an object in an oil and gas production environment being inspected using ultrasound data are discussed herein. However, embodiments of the disclosure can be employed for determining geometric dimensions of defects in objects being inspected using ultrasonic data which are not associated with an oil and gas production environment without limit.

Figure 1:
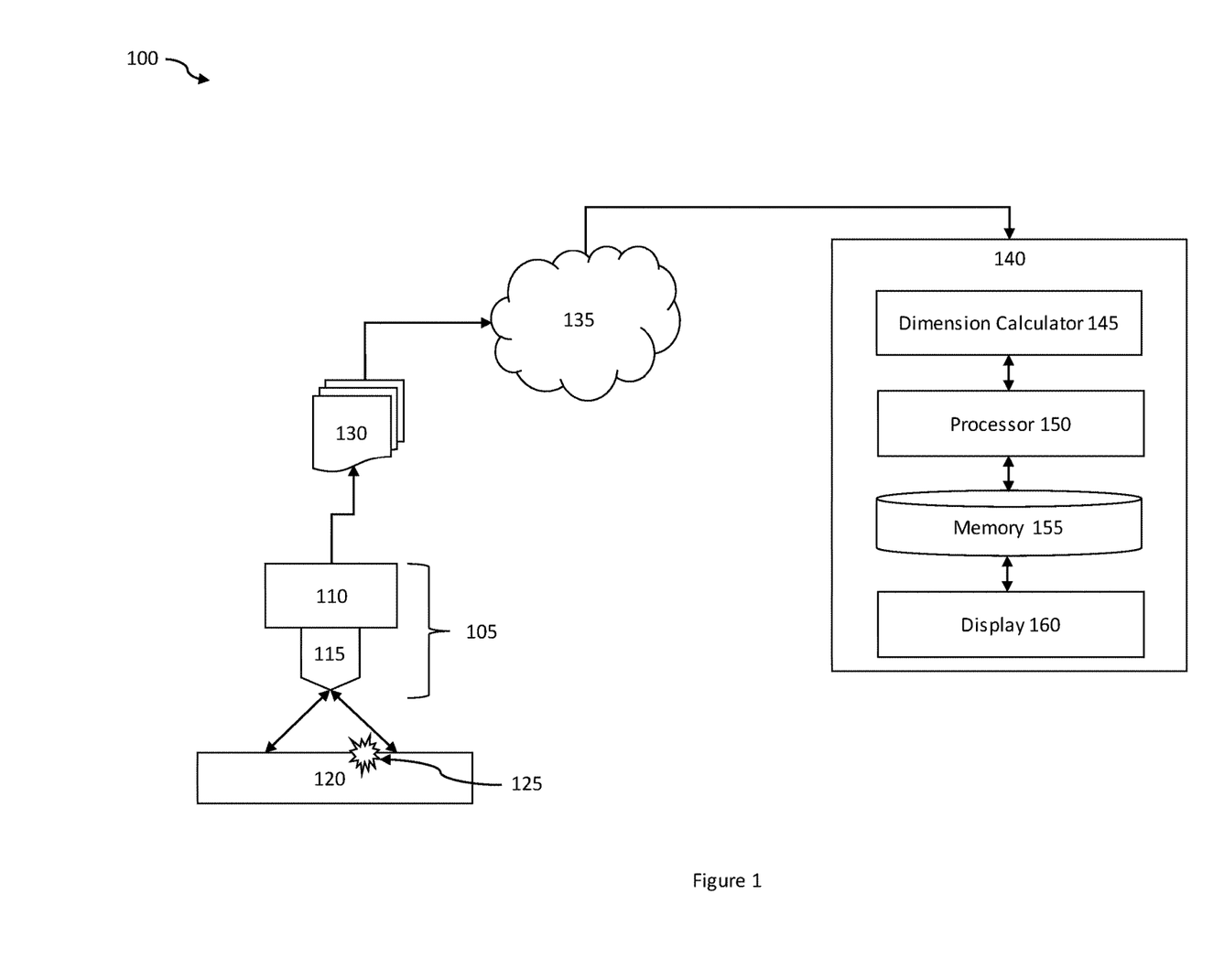
FIG. 1 is a block diagram illustrating an exemplary embodiment a system for determining geometric dimensions of a defect in an object being inspected using ultrasonic data.

FIG. 1 is a block diagram illustrating one example of a system 100 for determining geometric dimensions of a defect of an object being inspected using ultrasonic data. The system 100 includes an ultrasonic inspection device 105. The ultrasonic inspection device 105 includes a computing device 110 and one or more ultrasonic transducers 115. The ultrasonic transducer 115 can be configured to transmit and receive ultrasonic signals into an object 120 during an inspection of the object. The inspection can be performed to determine if a defect, such as defect 125, is present in or on the object 120. The inspection can cause the ultrasonic inspection device 105 to generate ultrasonic data 130 associated with the defect 125 of the object 120. The generated ultrasonic data 130 can include amplitude-based C-scan ultrasonic data and/or time of flight D-scan ultrasonic data which can be conveyed via a network 135 to a computing device 140. The computing device 140 can be co-located with the ultrasonic inspection device 105, such as at a site in which an inspection of the object 120 is being performed, or, alternatively, can be located remotely from the ultrasonic inspection device 105, such as at a remote inspection facility.

As shown in FIG. 1, the computing device 140 can include a dimension calculator 145 configured to determine the geometric dimensions of a defect in an object being inspected using ultrasound data. The dimension calculator 145 can be further coupled within the computing device 140 to a processor 150, a memory 155, and a display 160.

In FIG. 1, an ultrasonic inspection device 105 can be configured to perform an inspection of an object 120. The inspection can be performed, for example, as an inspection of laser seam welding, a resistance spot weld inspection, a composite inspection, a weld inspection, straight-beam inspection, corrosion inspection, immersion inspection, and/or an adhesive inspection. The inspection can be performed to determine the geometric dimensions of the defect 125 which can be present in the object 120 and to determine whether or not the geometric defect is within an acceptable quality criteria. The determined geometric dimensions can include a length, a width, or a diameter of an indication of the defect 125 present in the ultrasonic data 130. The systems, devices, methods and computer-readable mediums described herein can enable automated evaluation and determination of geometric features which can reduce the time needed to complete an inspection and improve the accuracy and reproducibility of the inspection process. In some embodiments, the ultrasonic inspection device 105 can be a hand-held, battery-powered device including a computing device 110 and one or more ultrasonic transducers 115.

The inspection device 105 can include a computing device 110 coupled to one or more ultrasonic transducers 115, as shown in FIG. 1. The one or more ultrasonic transducers 115 can include an angle beam transducer probe, a straight beam transducer probe, or a phase array of transducers. The ultrasonic transducers 115 can transmit ultrasonic signals into the object 120 and can receive reflected ultrasonic signals from the object 120. The reflected ultrasonic signals can correspond to a defect 125 present within or on the object 120 and can include indications of the defect 125. The reflected ultrasonic signals can be provided as ultrasonic data 130 and can include amplitude-based C-scan data and/or time of flight-based D-scan data. In some embodiments, the ultrasonic data 130 can include coordinate data in two dimensions (e.g., 2-D data). In some embodiments, the ultrasonic data 130 can include coordinate data in three dimensions (e.g., 3-D data).

The ultrasonic data 130 can be provided to a computing device coupled to the ultrasonic inspection device 105 via a network 135. The network 135 can include, for example, any one or more of a personal area network (PAN), a local area network (LAN), a campus area network (CAN), a metropolitan area network (MAN), a wide area network (WAN), a broadband network (BBN), a virtual private network (VPN), the Internet, or the like. Further, the network 135 can include, but is not limited to, any one or more of the following network topologies, including a bus network, a star network, a ring network, a mesh network, a star-bus network, tree or hierarchical network, and the like.

As shown in FIG. 1, the system 100 also includes a computing device 140. The computing device 140 can receive the ultrasonic data 130 and can process the data to determine geometric dimensions of the defect 125 of the object 120 based on the indications of the defect 125 that can be included in the ultrasonic data 130. The computing device 140 includes a dimension calculator 145 which can be configured as computer-readable, executable instructions, which when executed determine geometric dimensions of indications of the defect 125 included in the ultrasonic data 130 according to methods described later in relation to FIG. 4.

The computing device 140 also includes a processor 150 which can be configured to execute the computer-readable, executable instructions of the dimension calculator 145 or computer-readable, executable instructions stored in the memory 155. In some embodiments, the memory 155 can store a plurality of geometric template figures such as a circle, an ellipse, a square, a rectangle, a rhomboid, a triangle, a sphere, an ellipsoid, a cube, a cuboid, or a pyramid which can be used to determine the geometric dimensions of indications of defects. The memory 155 can also store one or more algorithms used to select the geometric template figure based on evaluating key coordinates of the indication of the defect 125 in the ultrasonic data 130. The memory 155 can also store one or more optimization algorithms used to determine the geometric dimensions of the indication of the object. The memory 155 can also store inspection dimension criterion, including passing inspection criterion, and failing inspection criterion. The determined geometric dimensions can thus be compared to the inspection criterion to determine whether or not the dimension of the defect indication is within an acceptable range. The computing device 140 also includes a display 160 configured to provide the geometric dimensions to a user, such as via a graphical user interface.

Figure 2:
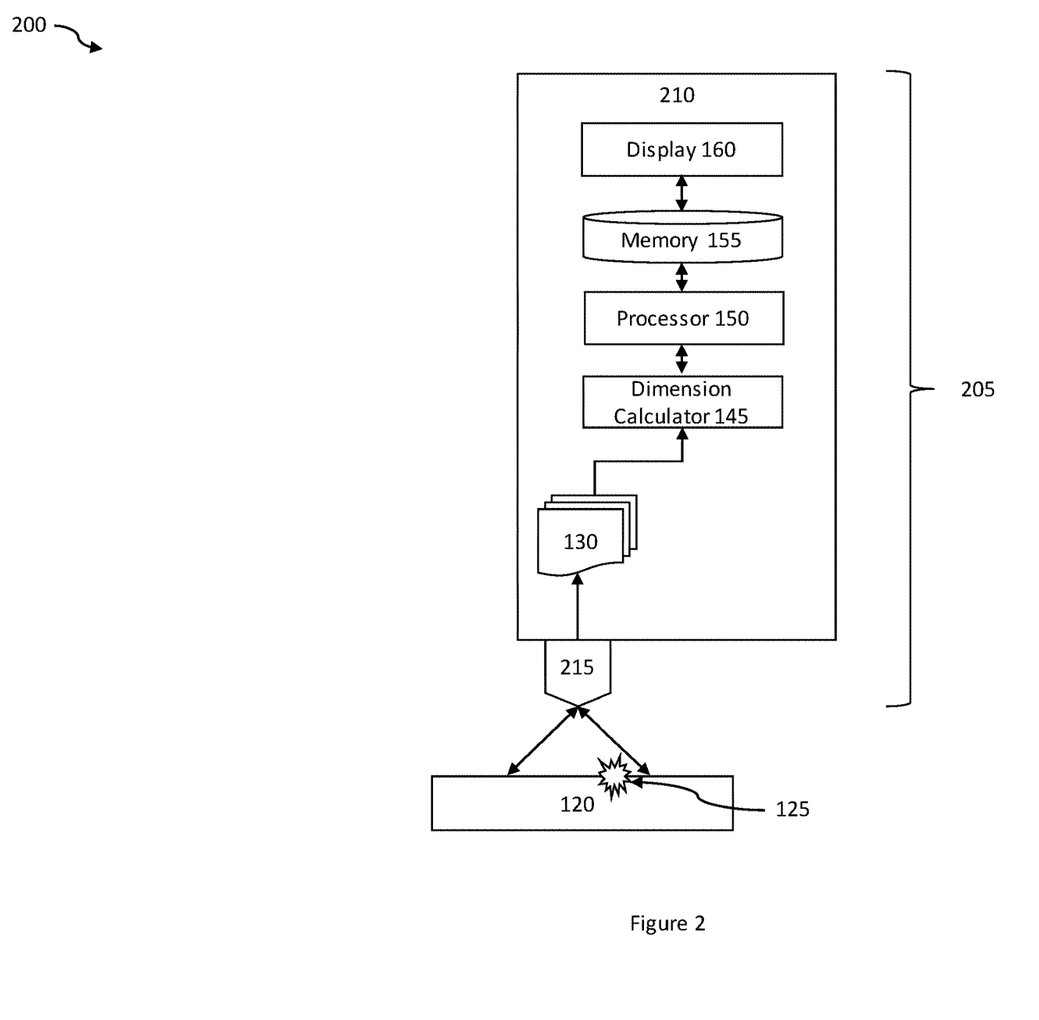
FIG. 2 is a diagram illustrating an exemplary embodiment of a device for determining geometric dimensions of a defect in an object being inspected using ultrasonic data.

FIG. 2 is a diagram illustrating an exemplary embodiment of a device for determining geometric dimensions of a defect in an object being inspected using ultrasonic data. The embodiment of the ultrasonic inspection device 205 shown in FIG. 2 illustrates an ultrasonic inspection device that can be configured as a portable, battery-powered ultrasonic inspection device configured to determine and provide geometric dimensions associated with an indication of a defect as describe herein, such as defect 125 associated with the object 120 shown in FIG. 2. The ultrasonic inspection device 205 can include a dimension calculator 145, a processor 150, a memory 155, and a display 160 which can perform similar functionality as the same components of the computing device 140 shown and described in relation to FIG. 1.

Figure 3:
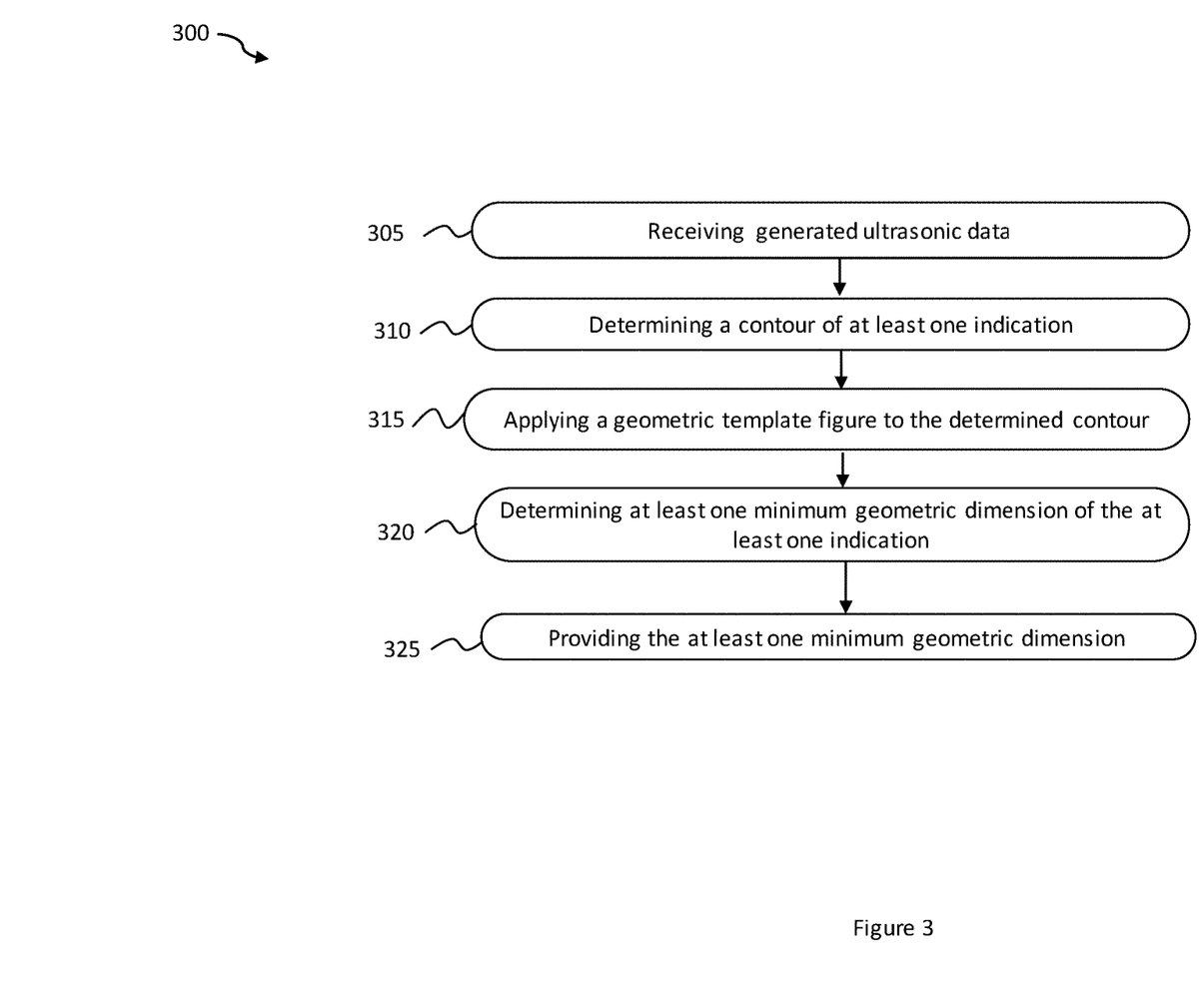
FIG. 3 is a flowchart illustrating an exemplary embodiment of a method for determining geometric dimensions of a defect in an object being inspected using ultrasonic data performed by the system and device disclosed herein.

FIG. 3 is a flowchart illustrating an exemplary embodiment of a method for determining geometric dimensions of a defect in an object being inspected using ultrasonic data performed by the systems and devices disclosed herein. In step 305, ultrasonic data, such as ultrasonic data 130, generated by an ultrasonic inspection device, such as device 105 of FIG. 1, can be received. The generated ultrasonic data 130 can be received by the dimension calculator 140 which can be configured remotely from the ultrasonic inspection device 105 as shown in FIG. 1, or can be receive by the dimension calculator 140 configured within a portable ultrasonic inspection device 205 as shown in FIG. 2. The generated ultrasonic data 130 can include amplitude-based C-scan data and/or time of flight based D-scan data and can include one or more indications of a defect (or multiple defects) which can be present within or on an object undergoing an inspection.

In step 310, the dimension calculator 140 determines a contour of at least one indication present in the generated ultrasonic data 130. The indication can be indicative of a defect associated with the object being inspected, for example the indication can be indicative of a defect in a spot weld or a laser-seam weld associated with an object. The contour of the indication can surround the indication of the defect and can indicate the approximate size and shape of the indication of the defect. The contour of the indication can be determined from an amplitude threshold value, for example when the generated ultrasonic data 130 includes amplitude based ultrasonic data. In some embodiments, the contour of the indication can be determined from a time of flight threshold value, for example when the generated ultrasonic data 130 includes recorded time of flight data. In some embodiments, the contour of the indication can be determined based on a combination of an amplitude threshold valve and a time of flight threshold valve, for example, when the generated ultrasonic data 130 includes amplitude based ultrasonic data and time of flight ultrasonic data.

The threshold value can be user configured and can be provided to the dimension calculator 140. Given a 2-dimensional or 3-dimensional representation of the ultrasonic data 130 arranged in a regular grid with a constant grid spacing, the coordinate points of the contour are calculated by linear distance scaling from a reference point which has the highest data value. For example, consider two points, A and B, that are each included in the ultrasonic data 130, where A has a higher data value than B and the value of point A lies above the predefined threshold while the value of point B lies below the predefined threshold value. The distance of the contour point from point A is now given by the following formula (Value A−Threshold Value)/(Value A−Value B)*Grid Spacing. This formula can provide a value which is smaller than the actual grid spacing, and the contour point can be placed at a distance from the point A on the regular grid given by the above formula. The axis of the grid on which the contour point is placed can depend on whether points A and B have a common coordinate axis, in which case the non-common axis is held fixed and the contour point is placed on the common axis. In the case where points A and B have no common axis, the contour points is placed at the corner of the rectangle formed by the above calculated offset from point A in both axes.

In step 315, the dimension calculator 140 uses a geometric dimension of the figure template, such as the radius, when a circle is chosen as the geometric figure template and the dimension calculator 140 determines the maximum radius of a circle which would only touch two points of the calculated contour. By requiring that the diameter of the resulting maximum circle only touch a maximum of two points of the contour, the resulting circle is fully enclosed by the contour. In this way, the dimension calculator 140 can determine this circle is the maximum circle fitting in the contour, because any circle with a larger diameter would touch or cross more than two points of the predefined contour. Accordingly, the resulting circle measures the minimum diameter which fits in the contour. For more complex geometric figure templates the dimension calculator 140 may perform multiple passes to determine all geometric features of the template. As an example, in case of an ellipse, the dimension calculator 140 can first determine the minimal diameter of a circle fitting in the contour as described above, and in a second step using this first minimal diameter as the minor axis of the ellipse, the dimension calculator 140 can perform a second pass to determine the major axis of the ellipse requiring that the major axis is perpendicular to the minor axis and the major axis and center point of the ellipse are chosen such that all points of the resulting ellipse lie within the determined contour. Based on the shape of the contour of the indication of the defect, the dimension calculator can select and apply a circle, an ellipse, a square, a rectangle, a rhomboid, a triangle, a sphere, an ellipsoid, a cube, a cuboid, or a pyramid as the geometric template figure. In some embodiments, the dimension calculator 140 can receive a user input to select a geometric template figure from a set of fixed or pre-selected geometric template figures. In some embodiments, the dimension calculator 140 can automatically select a geometric template figure based on evaluating coordinate data associated with one or more portions of the indication of the defect which are included in the generated ultrasonic data 130. In some embodiments, the dimension calculator 140 can adapt a user-selected or automatically-selected geometric template figure such that the adapted geometric template figure is fully enclosed by the determined contour. For example, the dimension calculator 140 can iteratively maximize the area of the geometric template figure. In this way, the systems and methods described herein can automatically determine a minimal geometric dimension of the indication of the defect 125, such as a length, a width, a diameter, an area, or a volume.

For defect indication and contour shapes that are more complex, the systems and methods described herein can compose a complex geometric template figure by applying multiple different geometric template figures in an iterative sequence. By first determining the geometric template figure with a maximal area enclosed within the applied contour, each iteration step can take into account the contour of the prior determined geometric template figure as a new contour boundary such that the geometric dimensions of the contour shape determined in each iteration can be used to determine a suitable geometric template figure.

In step 320, the dimension calculator 140 can determine at least one minimum geometric dimension of an indication of a defect of the object being inspected. The dimension calculator 140 can utilize the maximal dimensions of the geometric template figure applied in step 315 in order to determine a minimal dimension of the indication. The minimal geometric dimension can include a length, a width, a diameter, an area, or a volume of the indication of the defect. By maximizing the dimensions of the geometric template figure which is enclosed by the determined contour of the indication, the dimension calculator 140 can automatically determine and generate a minimal dimension of the indication of the defect as a numerical value. The generated numerical value can be used to automatically classify the geometric dimension of the indication in regard to an inspection criterion such that the determined geometric dimension can be a passing inspection dimension or a failing inspection dimension.

In step 325, the dimension calculator 140 can provide the at least one minimum geometric dimension. In some embodiments, the at least one minimum geometric dimension can be stored in the memory 155. In other embodiments, the at least one minimum geometric dimension can be provided via the display 160.

Figure 4:
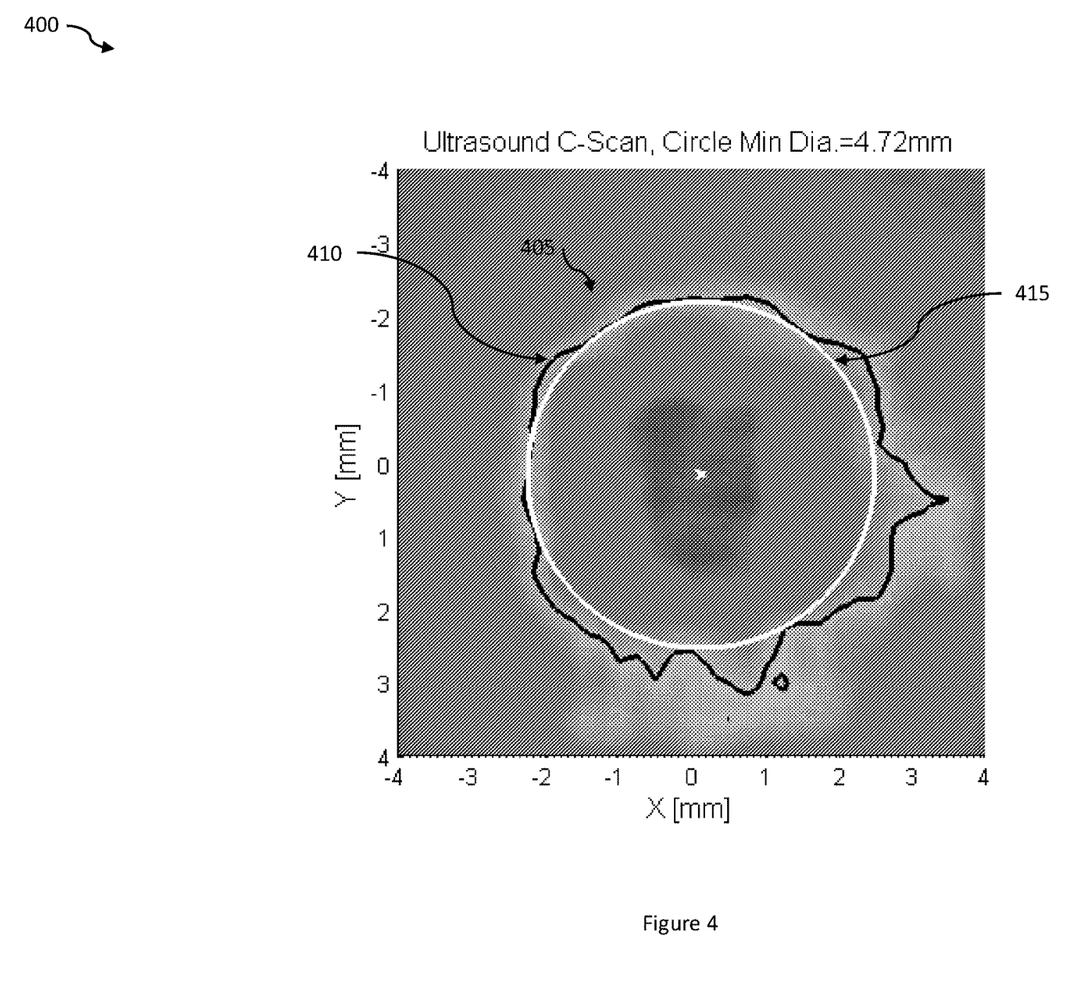
FIG. 4 is a diagram illustrating a minimum geometric dimension of an indication of a defect determined by the systems and methods disclosed herein.

FIG. 4 is a diagram illustrating a minimum geometric dimension of an indication of a defect determined according to the systems and methods disclosed herein. The ultrasonic data 300 shown in FIG. 4 illustrates C-scan ultrasonic data including an indication 405 of a defect of an object being inspected. As shown, a contour 410 of the indication of the defect has been determined. Based on the shape of the contour 410, the dimension calculator 140 can apply a geometric template FIG. 415 to the determined contour. In the example shown in FIG. 4, the dimension calculator 140 has determined that a circular geometric template figure can be applied such that the diameter of the circular geometric template FIG. 415 is fully enclosed by the determined contour 410. The dimension calculator 140 has determined the minimum geometric dimension of the indication of the defect is 4.72 mm based on the maximum diameter of the circular geometric template FIG. 415 applied to the contour 410 of the indication of the defect.

Figure 5:
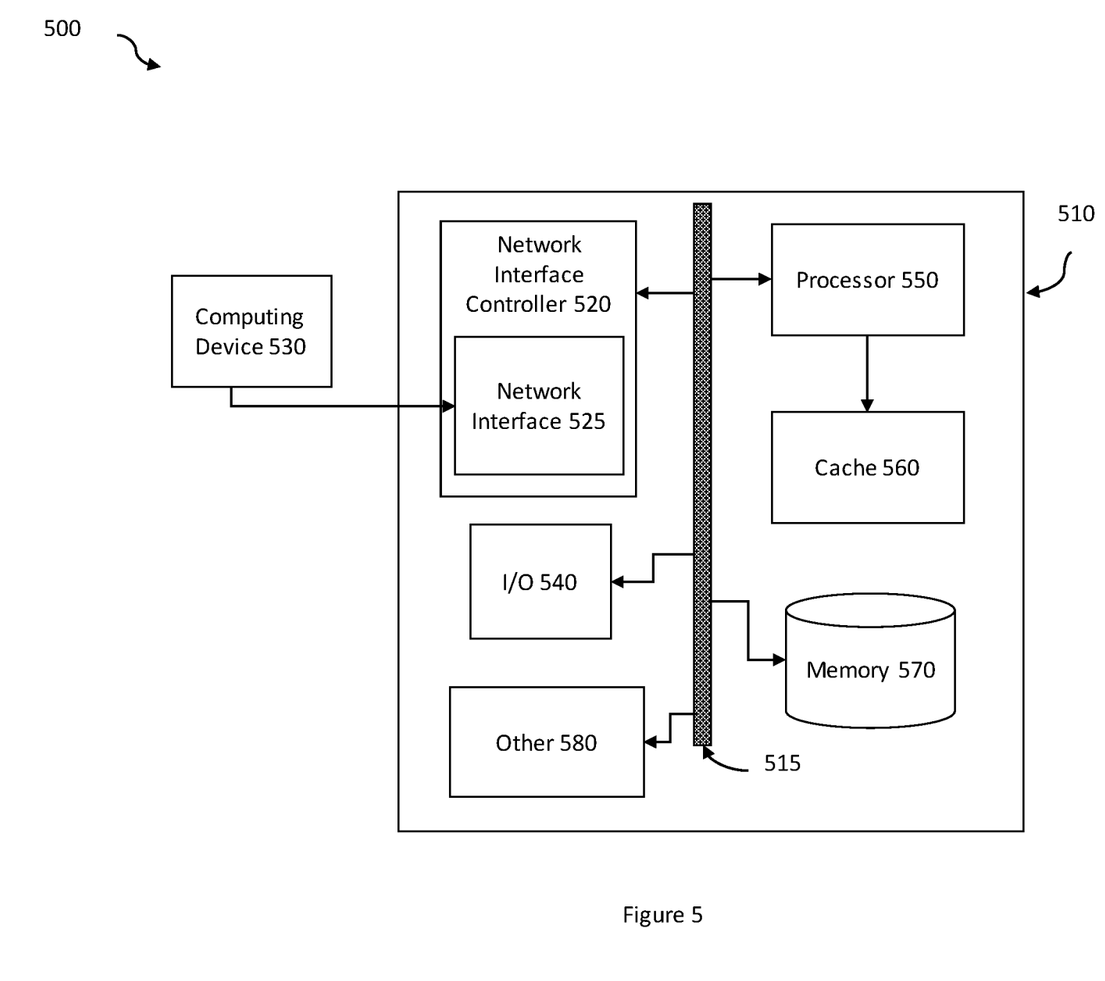
FIG. 5 is a block diagram of an exemplary computing device in accordance with an illustrative implementation of the system of FIG. 1 and/or the device of FIG. 2.

FIG. 5 is a block diagram of an exemplary computing device 510 suitable for use in the system of FIGS. 1 and 2. The computing device 510 can correspond to the computing devices 110 and 140 shown in FIG. 1 and the computing device 210 shown in FIG. 2.

In broad overview, the computing device 510 includes at least one processor 550 for performing actions in accordance with instructions, and one or more memory devices 570 for storing instructions and data. The illustrated example computing device 510 includes one or more processors 550 in communication, via a bus 515, with memory 570 and with at least one network interface controller 520 with a network interface 525 for connecting to external devices 530, e.g., a computing device (such as computing device 110, or the like). The one or more processors 550 are also in communication, via the bus 515, with each other and with any I/O devices at one or more I/O interfaces 540, and any other devices 580. The processor 550 illustrated incorporates, or is directly connected to, cache memory 560. Generally, a processor will execute instructions received from memory. In some embodiments, the computing device 510 can be configured within a cloud computing environment, a virtual or containerized computing environment, and/or a web-based microservices environment.

In more detail, the processor 550 can be any logic circuitry that processes instructions, e.g., instructions fetched from the memory 570 or cache 560. In many embodiments, the processor 550 is an embedded processor, a microprocessor unit or special purpose processor. The computing device 510 can be based on any processor, e.g., suitable digital signal processor (DSP), or set of processors, capable of operating as described herein. In some embodiments, the processor 550 can be a single core or multi-core processor. In some embodiments, the processor 550 can be composed of multiple processors.

The memory 570 can be any device suitable for storing computer readable data. The memory 570 can be a device with fixed storage or a device for reading removable storage media. Examples include all forms of non-volatile memory, media and memory devices, semiconductor memory devices (e.g., EPROM, EEPROM, SDRAM, flash memory devices, and all types of solid state memory), magnetic disks, and magneto optical disks. A computing device 510 can have any number of memory devices 570.

The cache memory 560 is generally a form of high-speed computer memory placed in close proximity to the processor 550 for fast read/write times. In some implementations, the cache memory 560 is part of, or on the same chip as, the processor 550.

The network interface controller 520 manages data exchanges via the network interface 525. The network interface controller 520 handles the physical, media access control, and data link layers of the Open Systems Interconnect (OSI) model for network communication. In some implementations, some of the network interface controller's tasks are handled by the processor 550. In some implementations, the network interface controller 520 is part of the processor 550. In some implementations, a computing device 510 has multiple network interface controllers 520. In some implementations, the network interface 525 is a connection point for a physical network link, e.g., an RJ 45 connector. In some implementations, the network interface controller 520 supports wireless network connections and an interface port 525 is a wireless transceiver. Generally, a computing device 510 exchanges data with other network devices 530, such as computing device 530, via physical or wireless links to a network interface 525. In some implementations, the network interface controller 520 implements a network protocol such as LTE, TCP/IP Ethernet, IEEE 802.11, IEEE 802.16, or the like.

The other computing devices 530 are connected to the computing device 510 via a network interface port 525. The other computing device 530 can be a peer computing device, a network device, or any other computing device with network functionality. For example, a computing device 530 can be a computing device 110 or a computing device 140, or the like which may be configured within the system illustrated in FIG. 1. In some embodiments, the computing device 530 can be a network device such as a hub, a bridge, a switch, a relay, or a router, connecting the computing device 510 to a data network such as a LAN, a WAN, the Internet, and/or a virtual private network.

In some uses, the I/O interface 540 supports an input device and/or an output device (not shown). In some uses, the input device and the output device are integrated into the same hardware, e.g., as in a touch screen. In some uses, such as in a server context, there is no I/O interface 540 or the I/O interface 540 is not used. In some uses, additional other components 580 are in communication with the computer system 510, e.g., external devices connected via a universal serial bus (USB).

The other devices 580 can include an I/O interface 540, external serial device ports, and any additional co-processors. For example, a computing device 510 can include an interface (e.g., a universal serial bus (USB) interface, or the like) for connecting input devices (e.g., a keyboard, microphone, mouse, or other pointing device), output devices (e.g., video display, speaker, refreshable Braille terminal, or printer), or additional memory devices (e.g., portable flash drive or external media drive). In some implementations an I/O device is incorporated into the computing device 510, e.g., a touch screen on a tablet device. In some implementations, a computing device 510 includes an additional device 580 such as a co-processor, e.g., a math co-processor that can assist the processor 550 with high precision or complex calculations.

The improved systems and methods described herein addresses the technical problem of determining geometric dimensions of indications of defects present in objects inspected using ultrasonic data. The systems and methods of the current disclosure address the technical problem of automatically determining the minimum geometric dimensions of an indication of a defect by using a pre-defined threshold contour and/or automatically selecting a geometric template figure which is enclosed by the pre-defined threshold contour. In this way, overestimation of the actual geometric dimensions of the indication can be avoided and more accurate inspection results can be automatically generated consistently for multiple inspection applications. Thus the system represents an improvement of computer functionality that determines the geometric dimensions of indications of defects present in objects inspected using ultrasonic data.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., a GPU (graphical processing unit), an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. An ultrasonic inspection device comprising:
one or more ultrasonic transducers configured to generate ultrasonic data associated with an inspection of an object; and
a computing device coupled to the one or more ultrasonic transducers, the computing device including a data processor and a memory storing computer-readable instructions, the data processor configured to execute the computer-readable instructions, which when executed, cause the data processor to perform operations including
receiving the generated ultrasonic data, the ultrasonic data including at least one indication of a defect of the object,
determining a boundary of the defect,
fitting, using one or more iterative optimization algorithms, a geometric template figure within the boundary,
determining, automatically, at least one maximum geometric dimension of the geometric template figure, wherein the at least one maximum geometric dimension of the geometric template figure corresponds to at least one minimum geometric dimension of the defect, and
providing, on a graphical user interface of a display, a result of the inspection of the object, wherein the result of the inspection comprises the at least one maximum geometric dimension.

2. The device of claim 1, wherein fitting the geometric template figure comprises:
performing, by the data processor, a pixel wise evaluation of the determined boundary, and
determining, using the one or more optimization algorithms, the geometric template figure from a plurality of geometric template figures such that an area of the geometric template figure is maximized while remaining fully enclosed by the boundary.

3. The device of claim 1, wherein the boundary is determined based on a pre-defined threshold associated with an amplitude or a time of flight of the ultrasonic data or a combination of an amplitude and a time of flight of the ultrasonic data.

4. The device of claim 1, wherein the geometric template figure is any one of circle, an ellipse, a square, a rectangle, a rhomboid, a triangle, a sphere, an ellipsoid, a cube, a cuboid, and a pyramid.

5. The device of claim 1, wherein the geometric template figure is pre-selected from a fixed set of geometric template figures.

6. The device of claim 1, wherein the geometric template figure is determined by maximizing an area of the geometric template figure enclosed by the determined boundary.

7. The device of claim 1, wherein the at least one maximum geometric dimension includes a length, a width, or a diameter of the at least one indication.

8. The device of claim 1, wherein the generated ultrasonic data includes an amplitude-based C-scan or a time of flight-based D-scan.

9. The device of claim 1, wherein the data processor is further configured to:
compare the at least one maximum geometric dimension to an inspection dimension criterion, and
automatically classify the at least one maximum geometric dimension as a passing inspection dimension or a failing inspection dimension based at least on the comparing.

10. The device of claim 1, wherein the one or more ultrasonic transducers include an angle beam transducer probe, a straight beam transducer probe, or a phase array of transducers.

11. A method comprising:
receiving, by a data processor of an ultrasonic inspection device, ultrasonic data associated with an inspection of an object, the ultrasonic data generated by one or more ultrasonic transducers of the ultrasonic inspection device, the ultrasonic data including at least one indication of a defect of the object;
determining, by the data processor, a boundary of the defect;
fitting, by the data processor using one or more iterative optimization algorithms, a geometric template figure within the boundary;
determining, by the data processor, at least one maximum geometric dimension of the geometric template figure, wherein the at least one maximum geometric dimension of the geometric template figure corresponds to at least one minimum geometric dimension of the defect; and
providing, by the data processor, a result of the inspection of the object to a graphical user interface of a display, wherein the result of the inspection comprises the at least one maximum geometric dimension.

12. The method of claim 11, wherein fitting the geometric template figure comprises:
performing, by the data processor, a pixel wise evaluation of the determined boundary; and
determining, using the one or more optimization algorithms, the geometric template figure from a plurality of geometric template figures such that an area of the geometric template figure is maximized while remaining fully enclosed by the boundary.

13. The method of claim 11, wherein the boundary is determined based on a pre-defined threshold associated with an amplitude or a time of flight of the ultrasonic data or a combination of an amplitude and a time of flight of the ultrasonic data.

14. The method of claim 11, wherein determining the at least one maximum geometric dimension of the geometric template figure that corresponds to the at least one minimum geometric dimension of the defect is performed automatically.

15. The method of claim 11, wherein the geometric template figure is any one of a circle, an ellipse, a square, a rectangle, a rhomboid, a triangle, a sphere, an ellipsoid, a cube, a cuboid, and a pyramid.

16. The method of claim 11, wherein the geometric template figure is pre-selected from a fixed set of geometric template figures.

17. The method of claim 11, wherein the geometric template figure is determined by maximizing an area of the geometric template figure enclosed by the determined boundary.

18. The method of claim 11, wherein the generated ultrasonic data includes an amplitude-based C-scan or a time of flight-based D-scan.

19. The method of claim 11, further comprising:
comparing, by the data processor, the at least one maximum geometric dimension to an inspection dimension criterion; and
automatically classifying, by the data processor, the at least one maximum geometric dimension as a passing inspection dimension or a failing inspection dimension based at least on the comparing.

20. A non-transitory computer readable storage medium containing program instructions, which when executed by at least one data processor causes the at least one data processor to perform operations comprising:
receiving ultrasonic data associated with an inspection of an object, the ultrasonic data generated by one or more ultrasonic transducers communicatively coupled to the at least one data processor, the ultrasonic data including at least one indication of a defect of the object;
determining a boundary of the defect;
fitting, using one or more iterative optimization algorithms, a geometric template figure within the boundary;
determining at least one maximum geometric dimension of the geometric template figure, wherein the at least one maximum geometric dimension of the geometric template figure corresponds to at least one minimum geometric dimension of the defect; and
providing a result of the inspection of the object to a graphical user interface of a display, wherein the result of the inspection comprises the at least one maximum geometric dimension.

* * * * *